US012449917B2

(12) United States Patent
Kaneda et al.

(10) Patent No.: US 12,449,917 B2
(45) Date of Patent: Oct. 21, 2025

(54) ELECTRONIC PEN

(71) Applicant: Wacom Co., Ltd., Saitama (JP)

(72) Inventors: Takenori Kaneda, Saitama (JP); Kohei Tanaka, Saitama (JP); Hideyuki Hara, Saitama (JP); Shunya Saito, Saitama (JP); Akiyuki Kake, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 18/799,360

(22) Filed: Aug. 9, 2024

(65) Prior Publication Data

US 2024/0402839 A1 Dec. 5, 2024

Related U.S. Application Data

(63) Continuation of application No. PCT/JP2022/046018, filed on Dec. 14, 2022.

(51) Int. Cl.
*G06F 3/0354* (2013.01)
*G06F 3/01* (2006.01)
*G06F 3/038* (2013.01)

(52) U.S. Cl.
CPC .......... *G06F 3/03545* (2013.01); *G06F 3/016* (2013.01); *G06F 3/0383* (2013.01)

(58) Field of Classification Search
CPC ... G06F 3/03545; G06F 3/0442; G06F 3/0441
USPC ................... 345/179; 178/18.01, 19.01–19.4
See application file for complete search history.

(56) References Cited

U.S. PATENT DOCUMENTS

| | | | | |
|---|---|---|---|---|
| 10,558,266 B2 * | 2/2020 | Longo | ................. | G06F 3/03543 |
| 10,817,082 B1 * | 10/2020 | Yildiz | ................. | G06F 3/03545 |
| 2019/0243473 A1 | 8/2019 | Katsurahira | | |

FOREIGN PATENT DOCUMENTS

| | | |
|---|---|---|
| JP | 2007-048268 A | 2/2007 |
| WO | 2015/098486 A1 | 7/2015 |

OTHER PUBLICATIONS

English Translation of the International Search Report for International Application No. PCT/JP2022/046018, mailed Feb. 21, 2023. (2 pages).

* cited by examiner

*Primary Examiner* — Koosha Sharifi-Tafreshi
(74) *Attorney, Agent, or Firm* — Seed IP Law Group LLP

(57) ABSTRACT

An electronic pen includes a tubular casing; a vibration transmitting member disposed within a hollow portion of the tubular casing and capable of transmitting vibration occurring in the vibration transmitting member to the tubular casing; a vibrator disposed on the vibration transmitting member; a pulse generator configured to generate a pulse signal which drives the vibrator; and a power supply circuit to power the pulse generator. The vibrator includes a plurality of electrode pins planted on the vibration transmitting member, and one or more wires formed of a shape memory alloy and extending between two electrode pins among the plurality of electrode pins. The one or more wires when supplied with the pulse signal from the pulse generator through the electrode pins expand and contract to thereby vibrate. Vibration of the one or more wires is transmitted to the tubular casing via the electrode pins and the vibration transmitting member.

23 Claims, 8 Drawing Sheets

ELECTRONIC PEN

BACKGROUND

Technical Field

The present disclosure relates to an electronic pen having a function of transmitting information to a user via a tactile sense.

Description of the Related Art

An electronic apparatus such as a smart phone, a mobile telephone terminal, and a portable computer may include a function of transmitting information to a user by stimulating a tactile sense of the user. For example, a vibrator is often used to vibrate a part touched by the human body so as to stimulate the tactile sense of the human body.

Patent Document 1 (Japanese Patent Laid-open No. 2007-48268) proposes, as the vibrator to be used in such method, a vibration actuator (vibrator) that generates vibration by feeding a pulse current through a shape memory alloy.

FIG. 10 illustrates a sample configuration of the vibration actuator disclosed in Patent Document 1. A vibration actuator 100 in the present example is formed of two lead wire portions 102 fixed to one of mutually opposing circular flat surfaces of a disk-shaped insulating unit 101, and a linear memory alloy 103 bent in a horseshoe shape and fixed to the other of the circular flat surfaces. The lead wire portions 102 and the shape memory alloy 103 are electrically connected to each other via the insulating unit.

In the present example, when a pulse voltage is applied to the shape memory alloy 103 through the lead wire portions 102, a pulse current flows through the shape memory alloy 103 and the temperature of the shape memory alloy 103 increases due to heat generated by a resistance of the shape memory alloy 103 itself. Then, as indicated in FIG. 11 illustrating a characteristic of the shape memory alloy, the shape memory alloy 103 is contracted due to the temperature increase and shortened in length by approximately 7%, for example. When application of the voltage ceases, the temperature of the shape memory alloy 103 returns to its original temperature, and the length of the shape memory alloy 103 too returns to its original length.

Accordingly, when a pulse voltage having a predetermined cycle as illustrated in (A) of FIG. 12 is supplied to the lead wire portions 102 of the vibration actuator 100, as schematically illustrated in (B) in FIG. 12, the shape memory alloy 103 repeats an operation, per each cycle of the pulse voltage. In each operation, in a pulse width period the temperature of the shape memory alloy 103 increases and the shape memory alloy 103 is contracted, and during an interval between the pulse width period and a next pulse width period, the shape memory alloy 103 is cooled and returns to its original temperature and the shape memory alloy 103 returns to its original length. As a result, the shape memory alloy 103 vibrates at a frequency corresponding to the frequency of the pulse voltage applied through the lead wire portions 102.

The vibration actuator 100 of Patent Document 1 is configured such that the vibration generated in the linear shape memory alloy 103 having a horseshoe shape is blocked by the insulating unit 101. Hence, in Patent Document 1, as described in paragraph 0021 thereof, when mounting the vibration actuator 100, for example, to a grip-rod-shaped information transmitting device, the vibration actuator 100 is affixed to the grip rod such that when the user grips the grip rod, the shape memory alloy 103 side would abut the pad of a fingertip, which is tactilely sensitive.

BRIEF SUMMARY

When the vibration actuator 100 of Patent Document 1 as described above is mounted to an electronic pen, the electronic pen can be provided with a function of transmitting information to a user via a tactile sense.

However, in a case where the vibration actuator 100 of Patent Document 1 described above is disposed within a casing of the electronic pen, a configuration is needed such that when the user grips the electronic pen, the shape memory alloy 103 abuts the pad of a fingertip, which is tactilely sensitive. To this end, the casing of the electronic pen needs an opening or a thin wall section where the shape memory alloy 103 of the vibration actuator 100 is disposed. This causes the configuration of the casing of the electronic pen to become complex.

In addition, the vibration actuator 100 of Patent Document 1 includes the insulating unit 101. In a case where the vibration actuator 100 is disposed on a circuit board within the casing of the electronic pen, the insulating unit 101 occupies a large space on the circuit board. Hence, when the vibration actuator 100 is disposed on the circuit board of the electronic pen, which is becoming increasingly thinner, placement of the vibration actuator 100 would interfere with arrangement of conductor patterns and other parts on the circuit board having a limited space. Thus, a degree of freedom in arrangement positions is limited, and it is difficult to arrange the shape memory alloy 103 to abut the pad of a fingertip while taking into consideration the arrangement positions of conductor patterns and other parts.

According to one aspect, embodiments of the present disclosure provide an electronic pen that can be provided with a function of transmitting information to a user via a tactile sense.

In order to solve the above problems, an electronic pen is provide which includes a tubular casing; a vibration transmitting member disposed within a hollow portion of the tubular casing in a state in which the vibration transmitting member is able to transmit vibration occurring in the vibration transmitting member to the tubular casing; and a vibrator disposed on the vibration transmitting member. The electronic pen also includes a pulse generator disposed within the hollow portion of the tubular casing and configured to generate a pulse signal which drives the vibrator, and a power supply circuit disposed within the hollow portion of the tubular casing and configured to supply power to the pulse generator. The vibrator includes a plurality of electrode pins planted on the vibration transmitting member and one or more wires formed of a shape memory alloy extended between two electrode pins among the plurality of electrode pins. The one or more wires expand and contract to thereby vibrate when supplied with the pulse signal from the pulse generator through the electrode pins, and vibration of the one or more wires is transmitted to the tubular casing via the electrode pins and the vibration transmitting member.

In the electronic pen having the configuration described above, the vibrator (a vibration actuator) includes a plurality of electrode pins planted on the vibration transmitting member and one or more wires formed of a shape memory alloy and extended between two electrode pins among the plurality of electrode pins, and a pulse signal is supplied to the one or more wires formed of a shape memory alloy through the electrode pins.

When the vibrator of the electronic pen having the configuration above is vibrated by the pulse signal, vibration is transmitted to the vibration transmitting member via the electrode pins. The vibration transmitting member is disposed within a hollow portion of the tubular casing in a state in which the vibration transmitting member can transmit the vibration occurring in the vibration transmitting member to the tubular casing of the electronic pen. The vibration of the vibration transmitting member vibrates the tubular casing, and the vibration is transmitted to a user.

Therefore, the electronic pen having the configuration described above does not need to transmit the vibration of the shape memory alloy of the vibrator directly to the user and, as a result it is not necessary to change the tubular casing of the electronic pen. Because the vibrator is configured of electrode pins and one or more wires of a shape memory alloy extending between the electrode pins, it is not necessary to provide an insulating unit as in Patent Document 1. In addition, the one or more wires can be disposed utilizing a space afforded by the height of the pins to spatially avoid other electronic parts and the like. As a result, a high degree of freedom is achieved to arrange the vibrator.

DETAILED DESCRIPTION

An electronic pen according to an embodiment of the present disclosure will hereinafter be described with reference to the drawings.

Figure 1A:
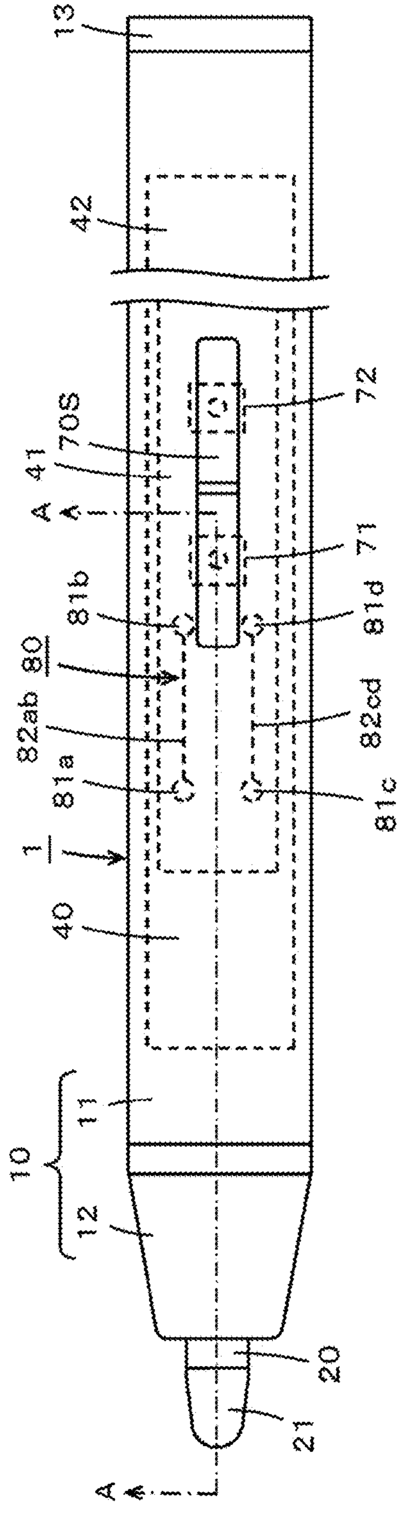
FIGS. 1A and 1B are diagrams illustrating an example of a configuration of an electronic pen according to an embodiment of the present disclosure.
Figure 1B:
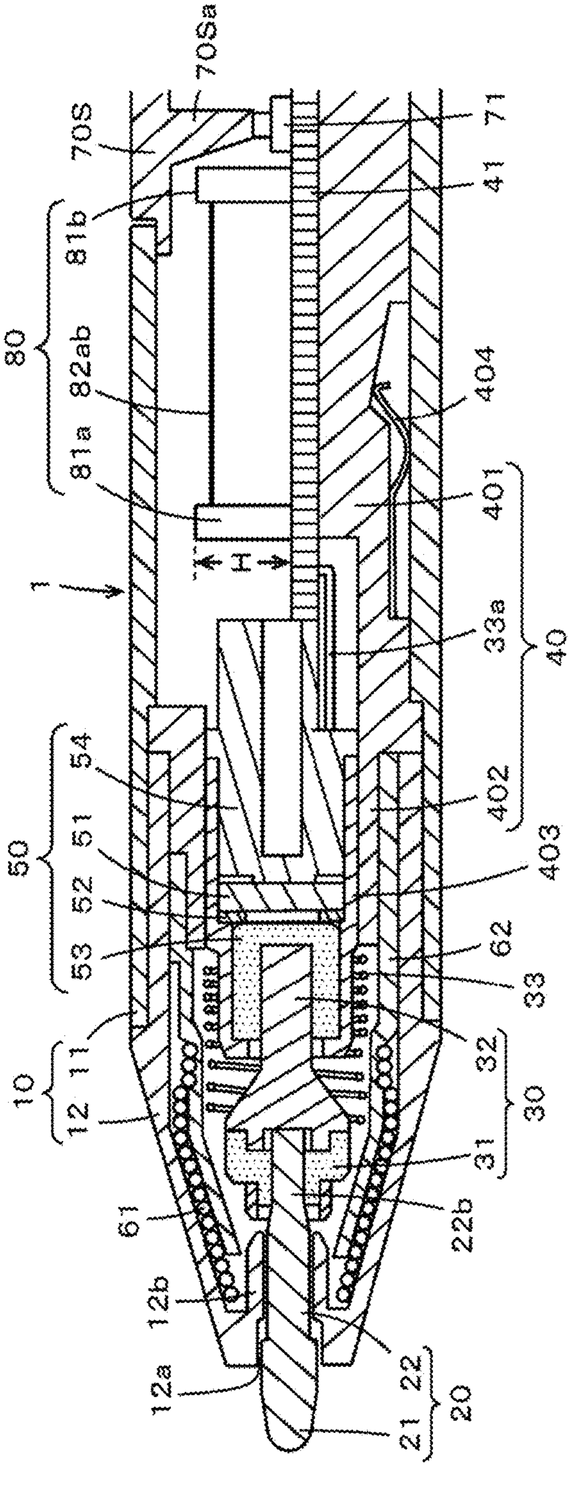

FIGS. 1A and 1B illustrates an example of a configuration of the electronic pen according to the embodiment of the present disclosure. The example of FIGS. 1A and 1B represents a configuration example of a case in which the present disclosure is applied to an electronic pen of a capacitive coupling type. FIG. 1A is a diagram illustrating an external appearance of an electronic pen 1 according to the present embodiment. FIG. 1B is a longitudinal sectional view illustrating a configuration of main parts of the electronic pen 1, and is a sectional view taken along line A-A of FIG. 1A.

As illustrated in FIGS. 1A and 1B, a casing 10 of the electronic pen 1 according to the present embodiment is in a tubular shape in the present example, which is formed of a tubular conical-shape front cap 12 that is fitted and attached to an opening on a pen tip side of a tubular cylindrical-shape casing main body 11.

The casing main body 11 is formed of a conductive material, such as a metal, to be grounded (grounded to earth) through a human body when a user holds and utilizes the electronic pen 1. The front cap 12 is formed of an insulative material, such as a resin.

As illustrated in FIGS. 1A and 1B, housed within a hollow portion of the casing main body 11 are a board holder 40 including a board mounting base portion 401, on which a circuit board 41 is mounted, and a battery 42 as a power supply. The battery 42 may be a primary battery or a secondary battery (a rechargeable battery). The opposite side of the casing main body 11 from the pen tip side (hereinafter referred to as a rear end side) is closed by a back cap 13, as illustrated in FIG. 1A.

The board holder 40 is formed of insulative resin. The board holder 40 includes the board mounting base portion 401 and a tubular portion 402, which is to the pen tip side of the board mounting base portion 401 in a longitudinal direction along the axial direction of the electronic pen 1. The board holder 40 is so disposed as to be not movable in the axial direction within a hollow portion of the casing 10. Also arranged within the tubular portion 402 is a pressure sensing part retaining portion 403 that holds pressure sensing parts constituting a pen pressure detecting portion 50.

The pressure sensing parts in the present example held within the pressure sensing part retaining portion 403 include a dielectric 51, a spacer member 52, a conductive elastic member 53, and a locking member 54. The pen pressure detecting portion 50 in the present example has a configuration of a variable capacitance capacitor that detects a pressure (a pen pressure) applied to a tip end portion 21 of a central rod 20 as a change in capacitance. A detailed configuration and operation of the pen pressure detecting portion 50 is well known and described, for example, in the national re-publication of PCT Patent Publication No. JP WO2015/098486, and detailed description thereof is omitted.

The central rod 20 is formed of a material having conductivity, for example a metal. In the present example, the central rod 20 has a circular section in a direction orthogonal to the axial direction, and includes the tip end portion 21 and a central rod main body portion 22, as illustrated in FIG. 1B. The central rod 20 is configured to be held by a central rod holder 30 in a state in which the tip end portion 21 projects outward from an opening 12*a* of the front cap 12 after the central rod 20 is inserted from an end portion 22*b* side of the central rod main body portion 22 into the casing 10 of the electronic pen 1 through the opening 12*a* of the tapered pen tip side of the front cap 12.

The central rod holder 30 is formed of a conductive material. The central rod holder 30 has a central rod holding member 31 formed of conductive elastic rubber, and includes a rod-shaped portion 32. The end portion 22*b* of the central rod main body portion 22 of the central rod 20, which is on an opposite side from the tip end portion 21, is fitted to the central rod holding member 31 of the central rod holder 30. The central rod 20 can be inserted into and removed from the central rod holder 30. The rod-shaped portion 32 of the central rod holder 30 is fitted to the pen pressure detecting portion 50. Hence, the pressure (the pen pressure) applied to the tip end portion 21 of the central rod 20 is transmitted to the pen pressure detecting portion 50 via the central rod holder 30.

In this case, the central rod 20 having conductivity and the casing main body 11 formed of a conductive material are electrically isolated (insulated) from each other due to the front cap 12 interposed between the central rod 20 and the casing main body 11.

A coil spring 33 that biases the central rod holder 30 to the central rod 20 side at all times is provided between the central rod holder 30 and the pressure sensing part retaining portion 403 housed in the tubular portion 402 of the board holder 40. The coil spring 33 is formed of a conductive material such as a conductive metal. As illustrated in FIG. 1B, one end 33*a* of the coil spring 33 is extended to the circuit board 41, and is electrically connected to a signal transmitting circuit disposed on the circuit board 41.

Since the central rod holder 30 is formed of a conductive material, the central rod 20 formed of a conductive material and fitted to the central rod holder 30 via the conductive central rod holding member 31 is electrically connected to the signal transmitting circuit disposed on the circuit board 41 through the coil spring 33. Thus, a signal from the signal transmitting circuit is transmitted, via the central rod 20, to a position detecting sensor.

As illustrated in FIG. 1B, the electronic pen 1 in the present example is provided with a peripheral electrode 61 formed of a conductive material that surrounds the periphery of the central rod 20. In the present example, the peripheral electrode 61 comprises a conductive metallic wire formed in a coil shape. In the present example, a tubular peripheral electrode holding portion 62 formed of a resin as an insulative material is so provided as to be fitted to an outer peripheral portion on the pen tip side of the pressure sensing part retaining portion 403 of the board holder 40. The peripheral electrode holding portion 62 has a tubular shape similar to the shape of an inner wall surface of the front cap 12 such that a space is formed between the peripheral electrode holding portion 62 and the inner wall surface of the front cap 12. As illustrated in FIG. 1B, the peripheral electrode 61 is disposed in the space between the outer peripheral surface of the tubular peripheral electrode holding portion 62 and the inner wall surface of the front cap 12.

A coil member constituting the peripheral electrode 61 is electrically connected to a circuit part on the circuit board 41 via an electric connecting member, which is not illustrated in FIG. 1B. The peripheral electrode 61 is electrically connected to the circuit part on the circuit board 41. The peripheral electrode 61 is used to receive an instruction signal sent from a position detecting device through a position detecting sensor, or send out a signal from the signal transmitting circuit to the position detecting sensor to allow detection of a tilt of the electronic pen 1, for example.

The casing main body 11 of the electronic pen 1 in the present example is provided with a switch operator 70S of side switches at a position, which is toward the rear end side of positions where the pads of an index finger and a thumb of the user would touch the casing main body 11 of the electronic pen 1 when the user holds the electronic pen 1. The switch operator 70S in the present example is configured as a seesaw type operator. As illustrated in FIG. 1A, along the axial direction of the casing main body 11, two side switches 71 and 72 are provided on the circuit board 41 within a hollow portion of the casing main body 11 directly below the switch operator 70S.

As is well known, operations of turning on and off the side switches 71 and 72 are so set to be associated with defined functions, such as a function corresponding to an operation of clicking a mouse pointer, in an electronic apparatus including a position detecting sensor that performs signal interaction with the electronic pen 1.

In this case, the side switch 71 on the pen tip side is turned on or off by an operation of depressing a pen-tip side of the switch operator 70S, and the side switch 72 on the rear end side is turned on or off by an operation of depressing a rear-end side of the switch operator 70S.

In the electronic pen 1 according to the present embodiment, a vibrator 80 is provided on the circuit board 41 at a position toward the pen tip side of the two side switches 71 and 72, and in the vicinity of where the pads of an index finger and a thumb of the user touch the casing main body 11 of the electronic pen 1 when the user holds the electronic pen 1.

Example Configuration of Vibrator 80

The vibrator 80 in the present example is formed of a plurality of electrode pins 81 planted on the circuit board 41 and one or more wires 82 formed of a shape memory alloy extended between two electrode pins among the plurality of electrode pins 81. The electrode pins 81 are formed of a conductive metal, such as Stainless Used Steel (SUS) in the present example. The wires 82 formed of the shape memory alloy in the present example are formed of a titanium alloy and have a thickness (diameter) of 50 to 75 μm, for example.

The plurality of electrode pins 81 in the present example include four electrode pins 81*a*, 81*b*, 81*c*, and 81*d*. The circuit board 41 in the present example is an elongated rectangular insulating substrate having a width of 7 mm, for example, which is slightly smaller than the diameter of the hollow portion of the casing main body 11. The four electrode pins 81*a*, 81*b*, 81*c*, and 81*d* in the present example are so arranged to be planted and fixed on the circuit board 41 at four corners of a rectangle having two sides parallel with the long side direction of the circuit board 41 and two sides parallel with the short side direction of the circuit board 41.

Each of the electrode pins 81*a*, 81*b*, 81*c*, and 81*d* in the present example is of a cylindrical shape whose diameter is 1 mm, for example, and whose height H from the circuit board 41 (see FIG. 1B) is H=2.4 mm, for example. The four electrode pins 81*a*, 81*b*, 81*c*, and 81*d* are arranged on the circuit board 41 at positions avoiding a conductive pattern and other electronic parts which are not connected to the electrode pins. On the circuit board 41, a conductive pattern (not illustrated) is provided which electrically connects each of the electrode pins 81*a*, 81*b*, 81*c*, and 81*d* to an output terminal of a pulse generator to be described later.

Figure 2:
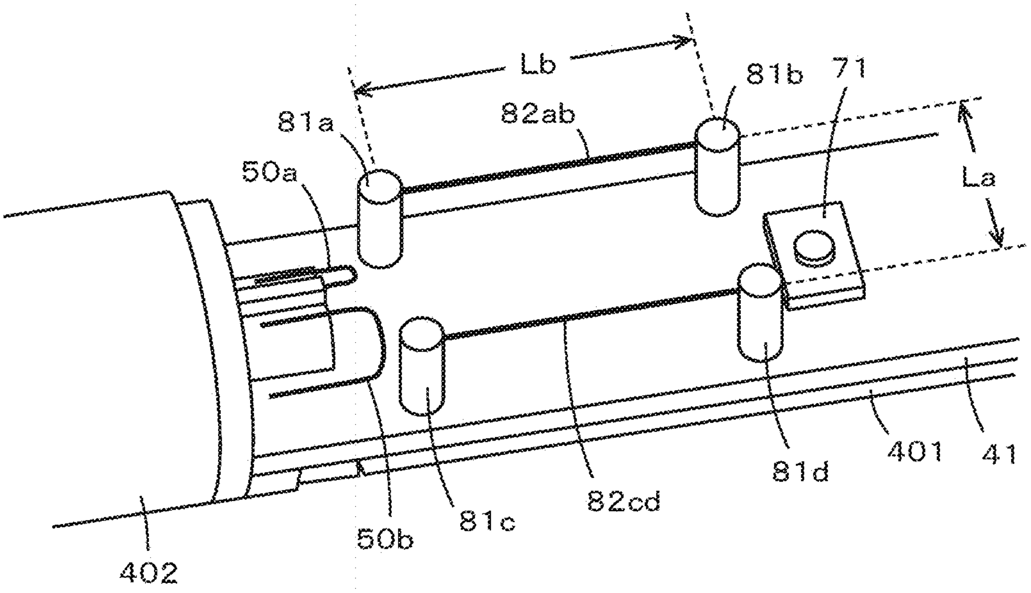
FIG. 2 is a diagram explaining a configuration of an example of a vibrator used in the electronic pen according to the embodiment of the present disclosure.

FIG. 2 is a view of the four electrode pins 81*a*, 81*b*, 81*c*, and 81*d* arranged on the circuit board 41 as viewed from an obliquely upper side of the circuit board 41. As illustrated in FIG. 2 and FIG. 1A, in the present example, the electrode pins 81*a* and 81*b* are arranged along the long side direction of the circuit board 41, and the electrode pins 81*c* and 81*d* are arranged also along the long side direction of the circuit board 41, while the electrode pins 81*a* and 81*b* oppose the electrode pins 81*c* and 81*d* in the short side direction of the circuit board 41.

As illustrated in FIG. 2, an interval between the electrode pins 81*a* and 81*c* in the short side direction of the circuit board 41 and an interval between the electrode pins 81*b* and 81*d* are set to be the same length La. The length La is slightly shorter than the length in the short side direction of the circuit board 41, and is set to be La=5 mm, for example. As illustrated in FIG. 2, an interval between the electrode pins 81*a* and 81*b* in the long side direction of the circuit board 41 and an interval between the electrode pins 81*c* and 81*d* are set to be the same length Lb. In the present example, the length Lb is larger than the interval La, and is set to be Lb=9 mm, for example.

In the present example, the wires 82 formed of a shape memory alloy include two wires—a wire 82*ab* extending between the two electrode pins 81*a* and 81*b* arranged side by side in the long side direction of the circuit board 41 (the axial direction of the electronic pen 1), and a wire 82*cd* extending between the electrode pins 81*c* and 81*d*. That is, in the present embodiment, the wire 82*ab* and the wire 82*cd* are so provided to extend between different pairs of the two electrode pins 81*a* and 81*b* and the electrode pins 81*c* and 81*d* arranged side by side in the long side direction of the circuit board 41 (the axial direction of the electronic pen 1).

As illustrated in FIG. 1B and FIG. 2, the wires 82*ab* and 82*cd* in the present example are extended in the vicinities of top portions in a height direction of the electrode pins 81*a* and 81*b* and the electrode pins 81*c* and 81*d*. Both ends of the wire 82*ab* and both ends of the wire 82*cd* are respectively fastened in the vicinities of the top portions in the height direction of the electrode pins 81*a* and 81*b* and the electrode pins 81*c* and 81*d*.

Hence, the wires 82*ab* and 82*cd* are arranged in midair so as to be separated from the upper surface of the circuit board 41 by a distance corresponding to a height slightly lower than the height H of the electrode pins 81*a*, 81*b*, 81*c*, and 81*d*. Thus, in arranging the wires 82*ab* and 82*cd*, it is not necessary to consider an arrangement conflict with a conductor pattern or other circuit parts disposed on the circuit board 41 whose height from the upper surface of the circuit board 41 is lower than the height H.

In the example of FIG. 2, lead wire portions 50*a* and 50*b* drawn out from both terminals of a variable capacitance capacitor 50C constituting the pen pressure detecting portion 50 are connected to a conductor pattern on the circuit board 41 to the pen tip side of the electrode pins 81*a* and 81*c*, and the lead wire portions 50*a* and 50*b* do not pose a hindrance to arranging the wires 82*ab* and 82*cd*.

In the electronic pen 1 according to the present embodiment, as illustrated in FIG. 1B, the switch operator 70S of the side switches is provided in the vicinity of the vibrator 80, and a leg portion 70Sa of the switch operator 70S is configured to depress the side switch 71. Thus, the leg portion 70Sa of the switch operator 70S may be present in such a manner as to partly overlap with the arrangement position of the vibrator 80. However, in the present embodiment, the wires 82*ab* and 82*cd* are provided in the longitudinal direction of the circuit board 41, and an empty space is provided between the wire 82*ab* and the wire 82*cd*. Thus, the leg portion 70Sa of the switch operator 70S can be positioned in this empty space, and no problem occurs even when the leg portion 70Sa of the operating element 70S is present so as to partly overlap with the arrangement position of the vibrator 80.

As described earlier, when a pulse voltage is applied to the wires 82*ab* and 82*cd* formed of a shape memory alloy, a pulse current flows through the wires 82*ab* and 82*cd*. In a pulse width period of the pulse current, the temperature of the wires 82*ab* and 82*cd* rises, and the wires 82*ab* and 82*cd* are contracted by approximately 5% to 7%. When application of the pulse voltage stops, the wires 82*ab* and 82*cd* are cooled and return to the original temperature, and the length of the wires 82*ab* and 82*cd* also returns to its original length.

Figure 3A:
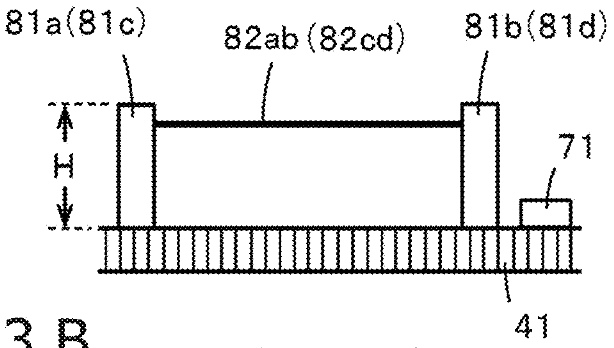
FIGS. 3A and 3B are diagrams illustrating the configuration of the example of the vibrator used in the electronic pen according to the embodiment of the present disclosure.

In the electronic pen 1 according to the present embodiment, as illustrated in FIG. 3A, the wires 82*ab* and 82*cd* formed of a shape memory alloy extend in a state of taut straight lines between the electrode pins 81*a* and 81*b* and between the electrode pins 81*c* and 81*d*, and are fastened in that state to the electrode pins 81*a* and 81*b* and the electrode pins 81*c* and 81*d*.

Figure 3B:
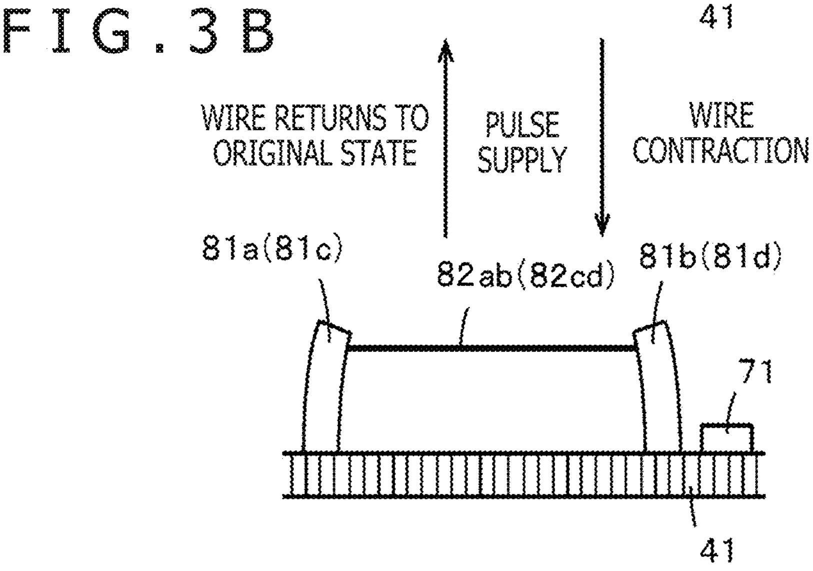

Therefore, when the pulse voltage is applied and the wires 82*ab* and 82*cd* formed of a shape memory alloy are contracted, the electrode pins 81*a* and 81*b* and the electrode pins 81*c* and 81*d* are displaced in the contracting direction of the wires 82*ab* and 82*cd*, as illustrated in FIG. 3B. When the pulse voltage stops, the wires 82*ab* and 82*cd* return to the state of the original length as illustrated in FIG. 3A, and the electrode pins 81*a* and 81*b* and the electrode pins 81*c* and 81*d* return to an upright state.

Hence, when a pulse signal (a pulse voltage) having a defined frequency is supplied between the electrode pins 81*a* and 81*b* and between the electrode pins 81*c* and 81*d*, the electrode pins 81*a* and 81*b* and the electrode pins 81*c* and 81*d* between which the wires 82*ab* and 82*cd* formed of a shape memory alloy are extended and fastened cycle through the state of FIG. 3A and the state of FIG. 3B in a cycle of the pulse voltage application.

That is, the wires 82*ab* and 82*cd* vibrate according to the cycle of the applied pulse voltage by expanding and contracting in the length direction of the wires 82*ab* and 82*cd*, and the electrode pins 81*a* and 81*b* and the electrode pins 81*c* and 81*d* vibrate accordingly. This vibration is transmitted to the circuit board 41, and is further transmitted to the board holder 40 holding the circuit board 41. Since the board holder 40 is in contact with the casing main body 11, the vibration is transmitted from the board holder 40 to the casing main body 11. Hence, the user of the electronic pen 1 senses the vibration of the vibrator 80 transmitted to the casing main body 11 with the pads of fingers of the user's hand through a tactile sense.

In the electronic pen 1 according to the embodiment, though not illustrated in FIGS. 1A and 1B, a disk-shaped part having a diameter slightly smaller than the diameter of the hollow portion of the casing main body 11 is provided to a rear end portion of the board holder 40, and the outer peripheral surface of the disk-shaped part is configured to come in contact with the casing main body 11. Further, in the present embodiment, as illustrated in FIG. 1B, a lower portion of the board mounting base portion 401 of the board holder 40 includes an elastic member 404 that presses and biases the board holder 40 to the circuit board 41 side of the board mounting base portion 401, to ensure that the board holder 40 reliably come in contact with the casing main body 11 due to the elastic member 404, to reliably transmit the vibration to the casing main body 11. The elastic member 404 in the present example is formed of a leaf spring.

As is understood from the above, in the present embodiment, the circuit board 41 and the board holder 40 constitute a vibration transmitting member.

Method of Extending Wire 82 Formed of Shape Memory Alloy

As described above, in the present embodiment, a wire 82 formed of a shape memory alloy is extended and fastened between two electrode pins 81 in a taut state (a state in which tension is applied to the wire 82). A method of fitting the wire 82 will be described.

First Example

FIGS. 4A to 4D are diagrams illustrating a first example of a method of extending the wire 82 between the two electrode pins 81. The example of FIGS. 4A to 4D represents a case where the wire 82*ab* is extended between the electrode pins 81*a* and 81*b*. Obviously the same is true for a case of extending a wire 82 between the other two electrode pins 81.

Figure 4A:
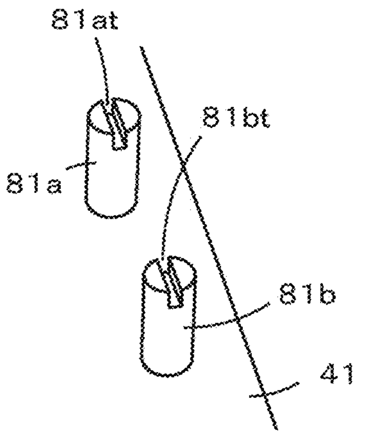
FIGS. 4A, 4B, 4C, and 4D are diagrams illustrating an example of a method of extending a wire formed of a shape memory alloy in the vibrator used in the electronic pen according to the embodiment of the present disclosure.

As illustrated in FIG. 4A, in the first example, linear grooves 81*at* and 81*bt* are formed in advance at centers of circular end surfaces of top portions of the electrode pins 81*a* and 81*b* in a cylindrical shape. The electrode pins 81*a* and 81*b* are planted on the circuit board 41 in a state in which the linear direction of the linear grooves 81*at* and 81*bt* is a direction parallel with the longitudinal direction of the circuit board 41.

Figure 4B:
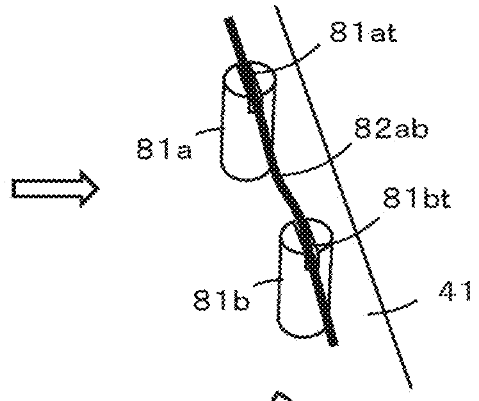

Next, as illustrated in FIG. 4B, the wire 82*ab* formed of a shape memory alloy is so fitted as to extend between the electrode pins 81*a* and 81*b* while being inserted into the linear grooves 81*at* and 81*bt* of the electrode pins 81*a* and 81*b*.

Then, tension is applied to the wire 82*ab* by pulling, at both ends of the wire 82*ab*, the wire 82*ab* extended between the electrode pins 81*a* and 81*b*. The wire 82*ab* is fastened at the parts of the linear grooves 81*at* and 81*bt* of the electrode pins 81*a* and 81*b* while a linearly taut state of the wire 82*ab* is maintained as illustrated in FIG. 4C.

A fastening method in this case may be any method such as a method of compression-bonding the wire 82*ab* to the linear grooves 81*at* and 81*bt* of the electrode pins 81*a* and 81*b* or a method of fastening the wire 82*ab* by swaging the parts of the linear grooves 81*at* and 81*bt* of the electrode pins 81*a* and 81*b*. In the present example, excesses of the wire 82*ab* extended from the electrode pin 81*a* and the electrode pin 81*b* are cut.

When a pulse current flows through the wire 82*ab* formed of a shape memory alloy, the temperature of the wire 82*ab* rises, and the wire 82*ab* is contracted by approximately 5% to 7%. Hence, it suffices to extend and fasten the wire 82*ab* between the electrode pins 81*a* and 81*b* in a state in which the contraction can be transmitted to each of the electrode pins 81*a* and 81*b*, which is possible even without applying high tension to the wire 82*ab*. However, in order to transmit the vibration caused by the expansion and contraction of the wire 82*ab* to the electrode pins 81*a* and 81*b* more reliably, higher tension is applied to the wire 82*ab* extended between the electrode pins 81*a* and 81*b* in the present example.

Figure 4C:
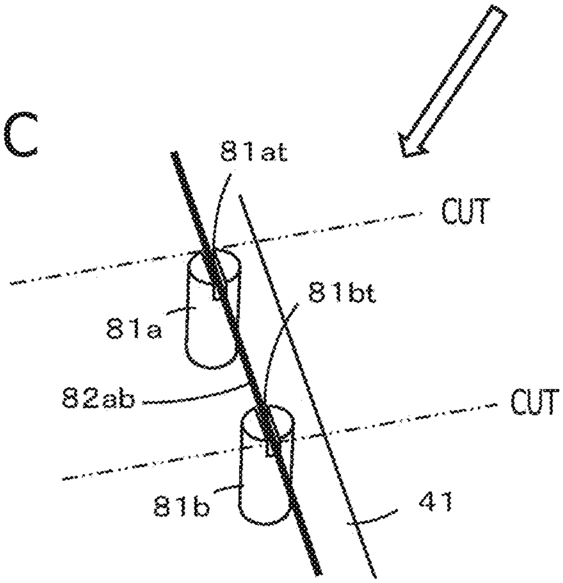
Figure 4D:
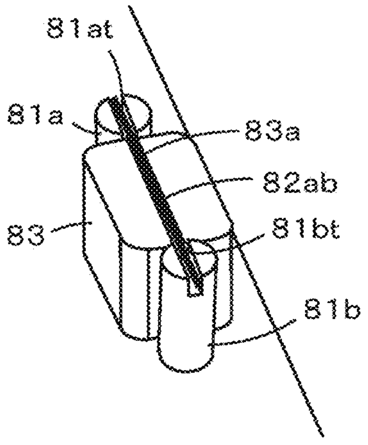

As illustrated in FIG. 4C, a defined tension is obtained by fastening the wire 82*ab* at the parts of the linear grooves 81*at* and 81*bt* of the electrode pins 81*a* and 81*b* while applying tension to the wire 82*ab*. However, in order to apply high tension to the wire 82*ab* between the electrode pins 81*a* and 81*b* more reliably, it is possible to provide an elastic member 83 between the electrode pins 81*a* and 81*b*, as illustrated in FIG. 4D. The clastic member 83 is configured to elastically displace the wire 82*ab* fastened to the electrode pins 81*a* and 81*b* in an upward direction or in a left-right direction to thereby apply high tension to the wire 82*ab*. In FIG. 4D, the elastic member 83 is provided with a linear groove 83*a* for receiving the wire 82*ab* while maintaining the linearity of the wire 82*ab*, though it is not necessary to provide the linear groove 83*a*.

Second Example

FIGS. 5A to 5D are diagrams illustrating a second example of the method of extending the wire 82 between the two electrode pins 81. The example of FIGS. 5A to 5D also represents a case where the wire 82*ab* is extended between the electrode pins 81*a* and 81*b*. Obviously that the same is true for a case where a wire 82 is extended between the two other electrode pins 81.

Figure 5A:
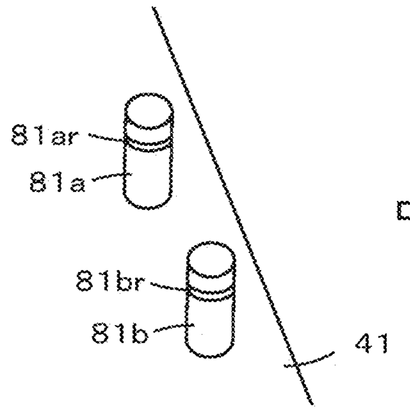
FIGS. 5A, 5B, 5C, and 5D are diagrams illustrating another example of the method of extending a wire formed of a shape memory alloy in the vibrator used in the electronic pen according to the embodiment of the present disclosure.

As illustrated in FIG. 5A, in the second example, ring-shaped grooves 81*ar* and 81*br* are formed in advance in the vicinities of top portions of side circumferential surfaces of the electrode pins 81*a* and 81*b* in a cylindrical shape.

Figure 5B:
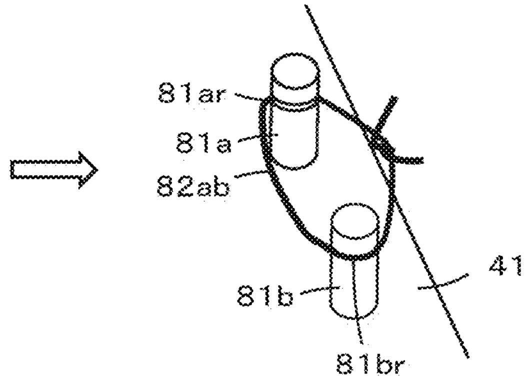

Next, in the second example, as illustrated in FIG. 5B, the wire 82*ab* formed of a shape memory alloy is formed in a ring shape in advance. Then, the wire 82*ab* in the ring shape is formed into an elongated flat elliptic shape. As illustrated in FIG. 5B, the wire 82*ab* is fitted and inserted into the ring-shaped groove 81*ar* of the electrode pin 81*a* by hooking one end side in the longitudinal direction of the wire 82*ab* around the ring-shaped groove 81*ar*, and the wire 82*ab* is fitted and inserted into the ring-shaped groove 81*br* of the electrode pin 81*b* by hooking another end side in the longitudinal direction of the wire 82*ab* around the ring-shaped groove 81*br*. The wire 82*ab* is thereby fitted to extend between the electrode pins 81*a* and 81*b*.

Figure 5C:
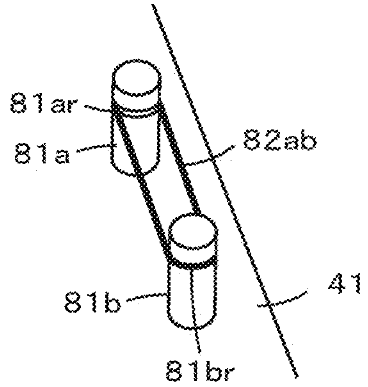
Figure 5D:
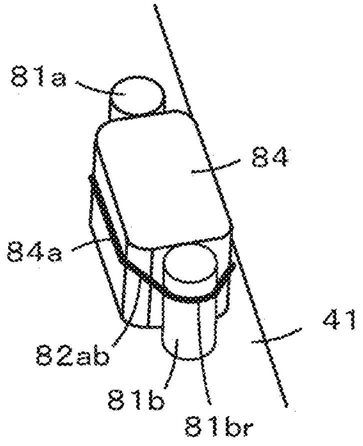

Next, by tightening the wire 82*ab* in the ring shape extending between the electrode pins 81*a* and 81*b* to remove a slack in the wire 82*ab*, as shown in FIG. 5C, the wire 82*ab* can be fastened to extend between the electrode pins 81*a* and 81*b* in a state a tension is applied to the wire 82*ab*. Also in the second example, in order to apply high tension to the wire 82*ab* between the electrode pins 81*a* and 81*b* more reliably, an elastic member 84 may be provided between the electrode pins 81*a* and 81*b*, as illustrated in FIG. 5D. The elastic member 84 elastically displaces the wire 82*ab* fastened to the electrode pins 81*a* and 81*b* in a sideward direction, to thereby apply tension to the wire 82*ab*. In FIG. 5D, side surfaces of the elastic member 84 are provided with a groove 84*a* for receiving the wire 82*ab*, though it is not necessary to provide the groove 84*a*.

Example of Electronic Circuit of Electronic Pen 1

Figure 6:
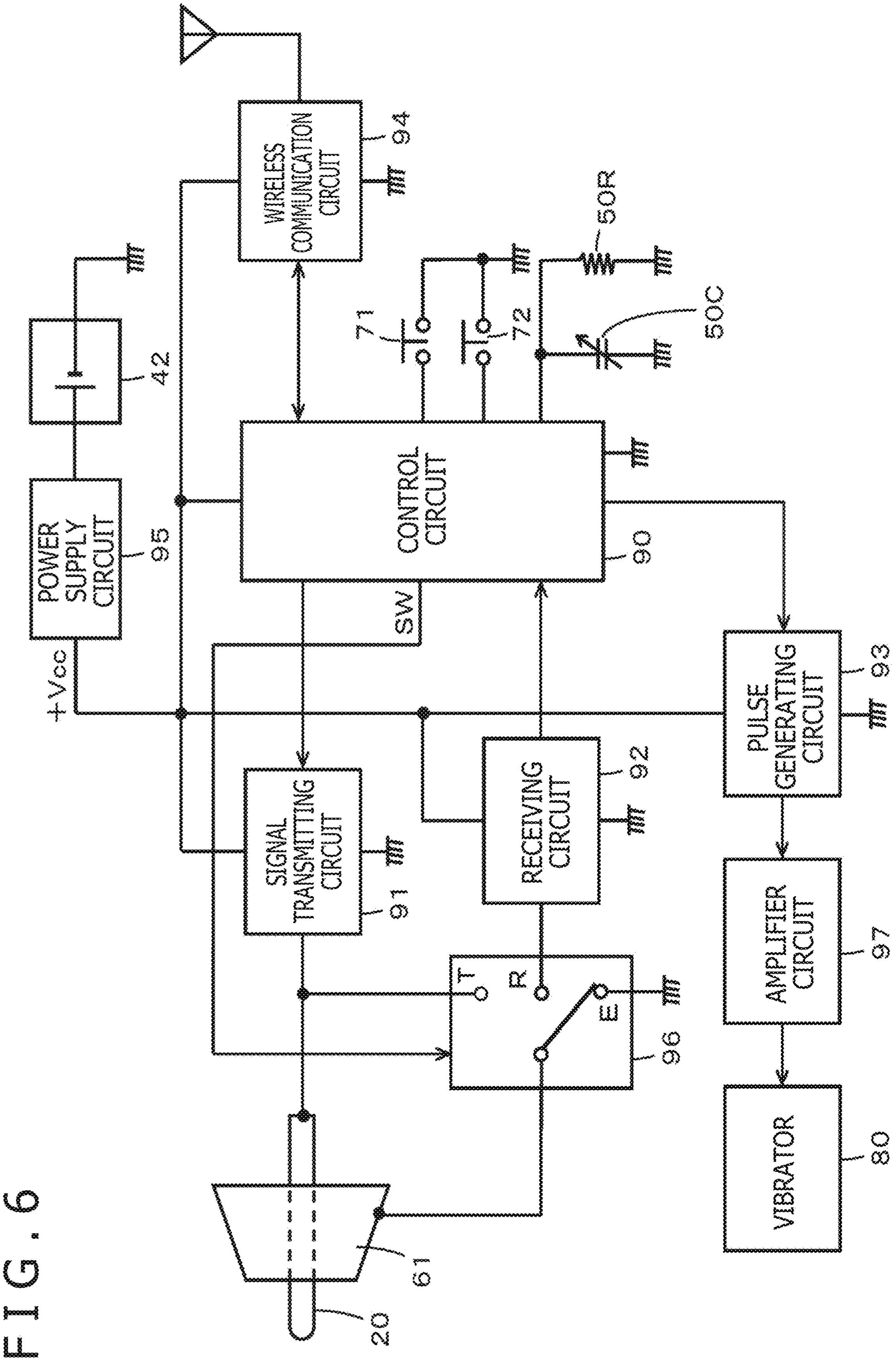
FIG. 6 is a block diagram illustrating an example of an electronic circuit in the electronic pen according to the embodiment of the present disclosure.

FIG. 6 illustrates an example of a configuration of an electronic circuit formed on the circuit board 41 of the electronic pen 1 according to the present embodiment. The configuration example of the electronic circuit will be described below.

In the electronic pen 1 according to the present embodiment, a control circuit 90 constituted by a microprocessor, for example, is connected with a signal transmitting circuit 91, a receiving circuit 92, a pulse generating circuit 93, and a wireless communication circuit 94. In addition, the control circuit 90 is connected with the side switches 71 and 72 and the variable capacitance capacitor 50C formed of the pen pressure detecting portion 50. The variable capacitance capacitor 50C is connected to a resistor 50R.

The electronic circuit of the electronic pen 1 according to the present embodiment is provided with a power supply circuit 75 that generates a power supply voltage Vcc from the voltage of the battery 42. The power supply voltage Vcc from the power supply circuit 75 is supplied to various parts, such as the control circuit 90, the signal transmitting circuit 91, the receiving circuit 92, the pulse generating circuit 93, and the wireless communication circuit 94.

The signal transmitting circuit 91 generates a predetermined frequency signal as a position detection signal under control of the control circuit 90. The position detection signal from the signal transmitting circuit 91 is sent out to a position detecting sensor through the central rod 20 formed of a conductive material.

The receiving circuit 92 receives a signal received from the position detecting sensor by the peripheral electrode 61, through a switch circuit 96, and supplies the signal to the control circuit 90.

In the electronic pen 1 according to the present embodiment, the peripheral electrode 61 is connected to a movable terminal of the switch circuit 96. The switch circuit 96 has a transmitting terminal T, a receiving terminal R, and a grounding terminal E. The transmitting terminal Tis connected to an output terminal of the signal transmitting circuit 91. The receiving terminal R is connected to an input terminal of the receiving circuit 92. The grounding terminal E is grounded. The movable terminal of the switch circuit 96 is switched by a switching control signal SW from the control circuit 90 to be connected to one of the transmitting terminal T, the receiving terminal R, and the grounding terminal E.

When the electronic pen 1 according to the present embodiment performs signal interaction with the position detecting sensor, three periods, that is, an indicated position detection period, a tilt detection period, and a signal reception period, are controlled by the control circuit 90 on a time-division basis. The control circuit 90 switches the switch circuit 96 using the switching control signal SW to effect the three periods on a time-division basis.

Specifically, in the indicated position detection period, the movable terminal of the switch circuit 96 is connected to the grounding terminal E by the switching control signal SW from the control circuit 90. Thus, in the indicated position detection period, the peripheral electrode 61 is grounded, so that the position detection signal from the signal transmitting circuit 91 is stably sent out through the central rod 20 to the position detecting sensor side.

In the present embodiment, in the indicated position detection period, the control circuit 90 supplies information concerning a pen pressure value detected by the pen pressure detecting portion 50 to the position detecting sensor side together with the position detection signal. That is, the control circuit 90 in the present example detects the pen pressure value based on the capacitance at the moment of the variable capacitance capacitor 50C constituting the pen pressure detecting portion 50. The information concerning the pen pressure value is transmitted to the position detecting sensor side by changing the frequency of the signal from the signal transmitting circuit 91 according to the pen pressure value.

The control circuit 90 may be configured to supply the information concerning the pen pressure value together with the position detection signal by converting the detected pen pressure value into a digital signal of a plurality of bits and modulating the signal to be output from the signal transmitting circuit 91 into an amplitude shift keying (ASK) signal or an on-off keying (OOK) signal according to the digital signal.

Next, in the tilt detection period, the movable terminal of the switch circuit 96 is connected to the transmitting terminal T by the switching control signal SW. At this time, the position detection signal from the signal transmitting circuit 91 is transmitted to the position detecting sensor not only from the central rod 20 but also from the peripheral electrode 61. The position detecting sensor side detects the tilt of the electronic pen 1 with respect to an input surface based on a distribution of the signals from the central rod 20 and the peripheral electrode 61 in a detection region on the position detecting sensor by a well-known tilt detecting method.

Then, in the signal reception period, the movable terminal of the switch circuit 96 is connected to the receiving terminal R by the switching control signal SW. Thus, as described earlier, a signal received from the position detecting sensor side by the peripheral electrode 61 is supplied to the receiving circuit 92 through the switch circuit 96, and is supplied from the receiving circuit 92 to the control circuit 90.

In the present embodiment, when the position detecting sensor side detects a signal from the electronic pen 1 at a predetermined signal level or higher, the position detecting sensor side transmits, to the electronic pen 1, a timing reference signal which defines the timing of one cycle of the above-described three periods in the electronic pen 1. The control circuit 90 of the electronic pen 1 performs time-division control of the above-described three periods according to the timing based on the timing reference signal. Synchronization of the above-described three periods is thereby achieved between the electronic pen 1 and the position detecting sensor side.

In the present embodiment, the position detecting sensor side monitors the information concerning the pen pressure value, which information is sent from the electronic pen 1, and detects whether or not the pen pressure value has become a predetermined value corresponding to a time when the pen tip of the electronic pen 1 comes in contact with the input surface of the position detecting sensor. When the position detecting sensor side then determines that the pen pressure value has become the predetermined value, the position detecting sensor side transmits notification information concerning the contact of the pen tip of the electronic pen 1 with the input surface to the electronic pen 1 through the position detecting sensor. By receiving the notification information concerning the contact of the pen tip with the input surface via the peripheral electrode 61, the electronic pen 1 recognizes that signal interaction can be performed with the position detecting sensor side in a stable manner, and the electronic pen 1 starts the time-division processing as described above.

The pulse generating circuit 93 generates a pulse signal (a pulse voltage) to be supplied to the vibrator 80, according to control of the control circuit 90. The pulse signal from the pulse generating circuit 93 is supplied to the vibrator 80 through an amplifier circuit 97. In the electronic pen 1 according to the present embodiment, the pulse signal is supplied to the wire 82*ab* through the electrode pins 81*a* and 81*b* constituting the vibrator 80, and is supplied to the wire 82*cd* through the electrode pins 81*c* and 81*d*.

Thus, as described earlier, the wires 82*ab* and 82*cd* produce vibrations by expanding and contracting according to the frequency of the pulse signal, and the vibrations are transmitted to the casing main body 11 via the circuit board 41 and the board holder 40 to stimulate the tactile sense of the user, and are sensed by the user. In the present embodiment, the lengths of the two wires 82*ab* and 82*cd* are selected to be equal to each other. Thus, the frequencies of the vibrations produced by the expansion and contraction of the two wires 82*ab* and 82*cd* are equal to each other.

In the present embodiment, the control circuit 90 causes the pulse generating circuit 93 to output a pulse signal according to the signal received from the position detecting sensor side through the peripheral electrode 61. That is, in the present embodiment, when the timing reference signal is received from the position detecting sensor side, the control circuit 90 causes the pulse generating circuit 93 to generate the pulse signal to vibrate the vibrator 80, to thereby communicate the reception of the timing reference signal to the user holding the electronic pen 1 via a tactile sense.

When the notification information concerning the contact of the pen tip with the input surface is received through the peripheral electrode 61, the control circuit 90 causes the pulse generating circuit 93 to generate the pulse signal to vibrate the vibrator 80, to thereby notify the user holding the electronic pen 1 of the contact of the pen tip with the input surface via a tactile sense.

The vibration frequency or vibration mode of the vibrator 80 may be the same between the case of communicating the reception of the timing reference signal and the case of a notification of the contact of the pen tip with the input surface, though in the present embodiment, the two cases can be distinguished from each other tactilely. That is, the pulse generating circuit 93 is configured such that the frequency of the pulse signal to be output, an interruption cycle of the pulse signal to be sent out, or the like, is changed and controlled according to a control signal from the control circuit 90.

For example, the control circuit 90 changes the frequency of the pulse signal to be output from the pulse generating circuit 93 between the case of communicating the reception of the timing reference signal and the case of notification of the contact of the pen tip with the input surface. Alternatively, the control circuit 90 changes the interruption cycle of the pulse signal to be sent out between the case of communicating the reception of the timing reference signal and the case of notification of the contact of the pen tip with the input surface. Specifically, in the case of communicating the reception of the timing reference signal, the pulse signal having a predetermined frequency is sent out continuously for three seconds, for example, and in the case of notification of the contact of the pen tip with the input surface, an operation of sending out the pulse signal for two seconds and then stopping sending out the pulse signal for one second is repeated a plurality of times. The interruption cycle of the pulse signal to be sent out is thus made to differ such that the two cases can be distinguished from each other through the tactile sense.

In the present embodiment, the signal from the position detecting sensor side is received only by the peripheral electrode 61. However, when the central rod 20 is configured to be used in a period of sending out the position detection signal and a reception period on a time-division basis, the signal from the position detecting sensor side can be received also through the central rod 20.

The side switches 71 and 72 are connected to the control circuit 90. The control circuit 90 detects on/off states of the side switches 71 and 72 switched by operation of the switch operator 70S. The control circuit 90 transmits information indicating the on/off states of the side switches 71 and 72 to the electronic apparatus including the position detecting sensor through the wireless communication circuit 94 in the present embodiment.

The wireless communication circuit 94 communicates with a wireless communication circuit provided in the electronic apparatus including the position detecting sensor. The wireless communication circuit 94 in the present example is constituted by a short-range wireless communication circuit of the Bluetooth® standard.

The information indicating the on/off states of the side switches 71 and 72 may be transmitted, for example, as the ASK modulated signal or the OOK modulated signal described above, from the signal transmitting circuit 91 to the position detecting sensor side through the central rod 20 rather than through the wireless communication circuit 94.

In the present embodiment, when the side switch 71 or the side switch 72 is turned on, the control circuit 90 not only transmits the on/off state information of the side switch 71 or the side switch 72 through the wireless communication circuit 94, but also drives the pulse generating circuit 93 to generate the pulse signal to thereby drives the vibrator 80. As a result, the vibration notifies the user that the electronic pen 1 has recognized the side switch 71 or 72 is turned on. In this case, the control circuit 90 may of course perform such control as to change the frequency of the pulse signal or change the interruption cycle of the pulse signal to be sent out between a case where the side switch 71 is turned on and a case where the side switch 72 is turned on.

The control circuit 90 can also be configured to drive the pulse generating circuit 93 in reference to a signal received through the wireless communication circuit 94 from the electronic apparatus including the position detecting sensor. For example, when the side switch 71 or the side switch 72 is turned on, the control circuit 90 may transmit the state information of the side switch 71 or the side switch 72 through the wireless communication circuit 94, and when information concerning the acknowledgment of reception of the state information is received from the electronic apparatus including the position detecting sensor, the control circuit 90 may drive the pulse generating circuit 93 to generate the pulse signal to thereby drive the vibrator 80.

The electronic pen 1 may be provided with a battery remaining capacity detecting circuit which detects, for example, the output voltage of the battery 42 is lowered below a predetermined value to detect a remaining capacity of the battery 42. When the detected remaining capacity of the battery indicates that charging is necessary or the battery needs to be replaced, the control circuit 90 may send a corresponding notification to the user by driving the pulse generating circuit to generate the pulse signal.

As described above, the electronic pen 1 according to the present embodiment drives the pulse generating circuit 93 to generate the pulse signal to thereby drive the vibrator 80 in reference to a signal from the outside, and drives the pulse generating circuit 93 to generate the pulse signal to thereby drive the vibrator 80 according to an internal event of the electronic pen 1 (an operation of a side switch, a decrease in the remaining capacity of the battery, or the like).

The vibration frequency or the vibration mode is changed by changing the frequency of the pulse signal or changing the interruption cycle of the pulse signal to be sent out according to a difference in each cause for vibrating the vibrator 80, to thereby notify the different causes of the vibrations to the user of the electronic pen 1.

Effects of Electronic Pen 1

As described above, the electronic pen 1 according to the foregoing embodiment can transmit various kinds of information to the user holding the electronic pen 1 through the tactile sense by using the vibrator 80.

In the present embodiment, the vibrator 80 is vibrated when supplied with a pulse signal, and the vibration is transmitted to the casing main body 11 of the electronic pen 1 via the vibration transmitting member such as the circuit board and the board holder. It is hence unnecessary to bring the shape memory alloy of a vibration actuator into direct contact with the pad of a finger of the user as in the case of Patent Document 1. Hence, it is not necessary to make change to the casing of the electronic pen.

The vibrator 80 includes a plurality of electrode pins and one or more wires formed of a shape memory alloy extending between two of the plurality of electrode pins. Hence, a space for planting the electrode pins and a space for extending the wire suffice as an installation space for the vibrator. It thus becomes easy to arrange the vibrator 80 while avoiding other electronic parts and the arrangement positions of conductive patterns on the circuit board.

Modifications of Vibrator

In the electronic pen 1 according to the foregoing embodiment, one or more wires formed of a shape memory alloy in the vibrator are so arranged to extend in a direction along the longitudinal direction of the circuit board 41, but are not limited to such configuration.

First Modification

Figure 7A:
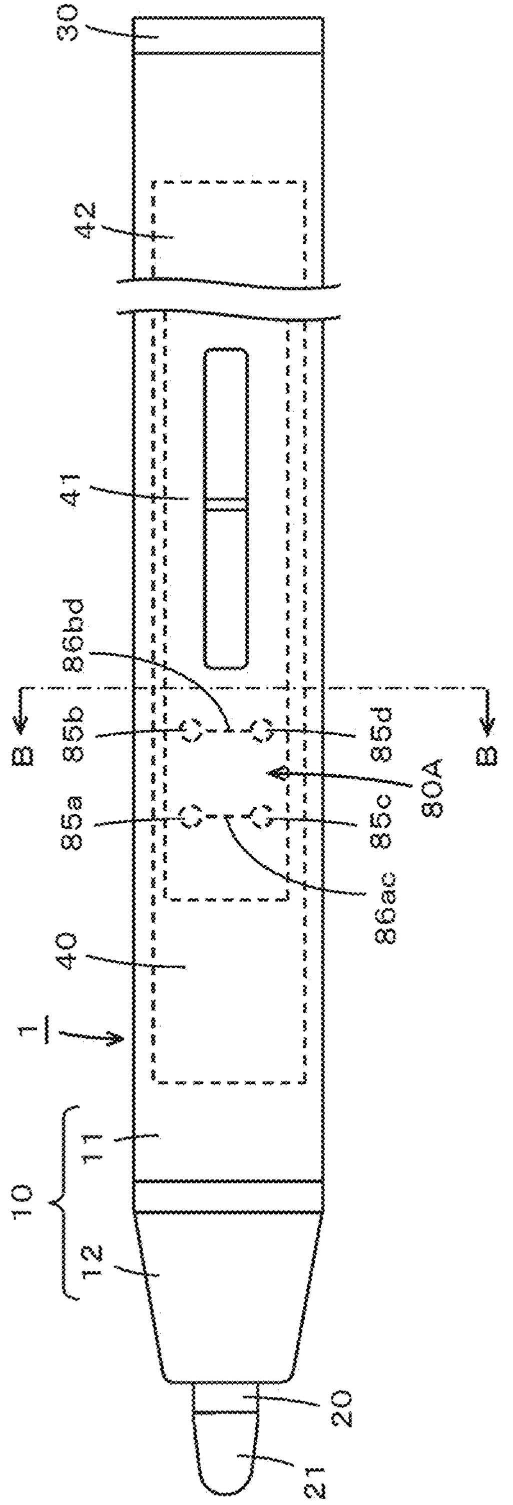
FIGS. 7A and 7B are diagrams illustrating another example of the configuration of the electronic pen according to the embodiment of the present disclosure.
Figure 7B:
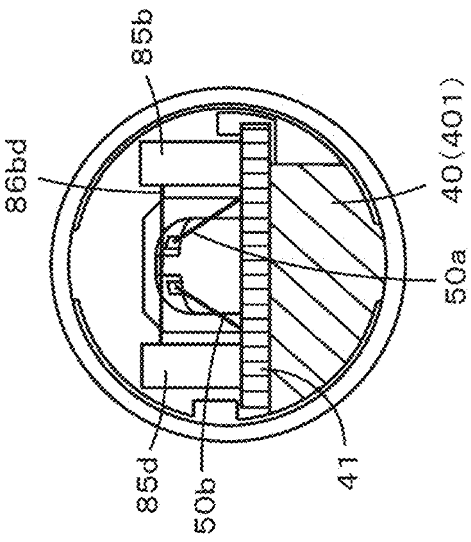

FIGS. 7A and 7B are diagrams illustrating a first modification of the vibrator. FIG. 7A is a diagram illustrating the external appearance of an electronic pen 1A in the present example. FIG. 7B is a sectional view taken along line B-B of FIG. 7A. The first modification is different from the foregoing example only in terms of the extending direction of the wires in the vibrator. The first modification otherwise has a configuration similar to that of the vibrator 80 and various parts of the electronic pen 1 according to the foregoing embodiment.

As illustrated in FIG. 7A, a vibrator 80A in the present example is also disposed on the circuit board 41 mounted on the board mounting base portion 401 (see FIG. 1B and FIG. 7B) of the board holder 40. In the vibrator 80A in the present example, as in the vibrator 80 according to the foregoing embodiment, four electrode pins 85*a*, 85*b*, 85*c*, and 85*d* formed of SUS as an example of a conductive metal are planted and fixed on the circuit board 41 at four corners of a rectangle having two sides parallel with the long side direction of the circuit board 41 and two sides parallel with the short side direction of the circuit board 41, as illustrated in FIG. 7A.

In the present example, the wire formed of a shape memory alloy includes two wires, that is, a wire 86*ac* extending between the two electrode pins 85*a* and 85*c* arranged side by side in the short side direction of the circuit board 41 (a direction orthogonal to the axial direction of the electronic pen 1) and a wire 86*bd* extending between the electrode pins 85*b* and 85*d*. That is, in the present embodiment, the wire 86*ac* and the wire 86*bd* extend between different pairs of the two electrode pins 85*a* and 85*c* and the electrode pins 85*b* and 85*d*, respectively, arranged side by side in the short side direction of the circuit board 41 (a direction orthogonal to the axial direction of the electronic pen 1).

Also in the first modification, as in the vibrator 80 of the electronic pen 1 according to the foregoing embodiment, a pulse signal (a pulse voltage) is applied to the wires 86*ac* and 86*bd* of the vibrator 80A through the electrode pins 85*a* and 85*c* and the electrode pins 85*b* and 85*d*. The wires 86*ac* and 86*bd* thereby vibrate at a frequency corresponding to the frequency of the pulse signal (the pulse voltage). The vibration is transmitted to the casing main body 11 of the electronic pen 1A through the electrode pins 85*a* and 85*c* and 85*b* and 85*d*, the circuit board 41, and the board holder 40, and is transmitted to the user.

Second Modification

Figure 8:
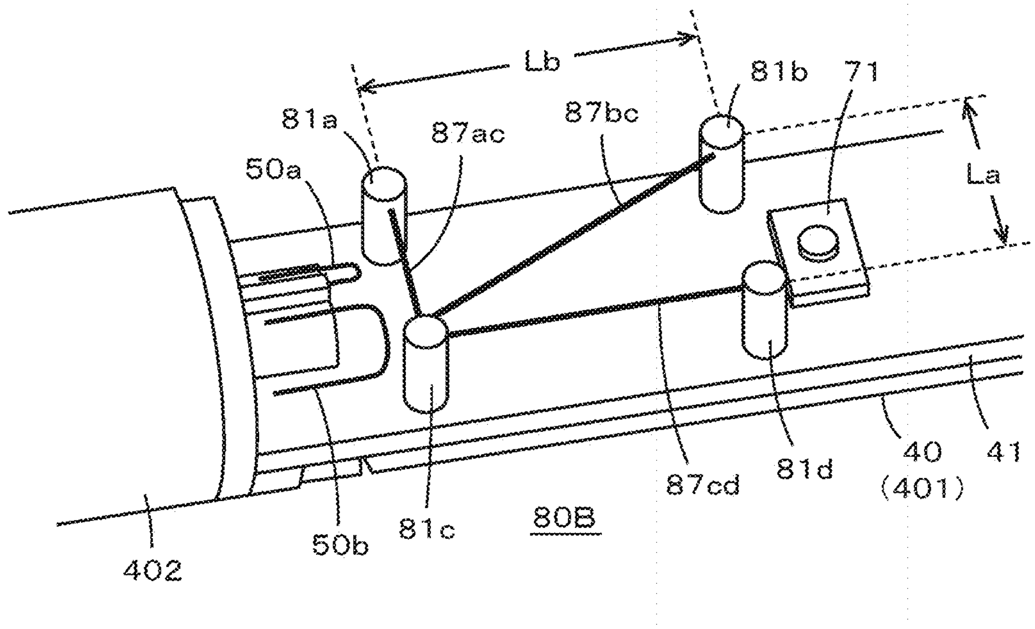
FIG. 8 is a diagram explaining a configuration of another example of the vibrator used in the electronic pen according to the embodiment of the present disclosure.

FIG. 8 is a diagram illustrating a second modification of the vibrator, and is a view of a plurality of electrode pins arranged on the circuit board 41 as viewed from an obliquely upper side of the circuit board 41. In a vibrator 80B according to the second modification, the four electrode pins 81*a*, 81*b*, 81*c*, and 81*d* of the vibrator 80 according to the foregoing embodiment are used without any change. In the vibrator 80B according to the second modification, a wire 87*ac* formed of a shape memory alloy is extended between the electrode pin 81*a* and the electrode pin 81*c*, a wire 87*bc* formed of a shape memory alloy is extended between the electrode pin 81*b* and the electrode pin 81*c*, and a wire 87*cd* formed of a shape memory alloy is extended between the electrode pin 81*c* and the electrode pin 81*d*. That is, in the second modification, three wires 87*ac*, 87*bc*, and 87*cd* are extended to one electrode pin 81*c*.

In the second modification, a pulse voltage is applied between the electrode pin 81*a* and the electrode pin 81*c*, between the electrode pin 81*b* and the electrode pin 81*c*, and between the electrode pin 81*c* and the electrode pin 81*d*. A pulse signal (a pulse voltage) is thereby applied to the wire 87*ac*, the wire 87*bc*, and the wire 87*cd* to generate vibrations. In this case, the control circuit 90 may independently control the application of the pulse signal (the pulse voltage) to each of the wire 87*ac*, the wire 87*bc*, and the wire 87*cd*, or may simultaneously apply the pulse signal (the pulse voltage) to the three wires 87*ac*, 87*bc*, and 87*cd*.

The control circuit 90 may control which of the wire 87*ac*, the wire 87*bc*, and the wire 87*cd* to vibrate in a case where the control circuit 90 independently controls the application of the pulse signal (the pulse voltage) between the electrode pin 81*a* and the electrode pin 81*c* of the vibrator 80B, between the electrode pin 81*b* and the electrode pin 81*c*, and between the electrode pin 81*c* and the electrode pin 81*d*.

For example, various of manners of control are possible as follows:

(1) A configuration is made such that pulses are supplied to only one of the wire 87*ac*, the wire 87*bc*, and the wire 87*cd*, and the control circuit 90 controls which wire to supply the pulses to.

(2) A configuration is made such that pulses are supplied to two wires of any of a set of the wire 87*ac* and the wire 87*bc*, a set of the wire 87*ac* and the wire 87*cd*, or a set of the wire 87*bc* and the wire 87*cd*, and the control circuit 90 controls which set of two wires to supply the pulses to.

(3) A configuration is made such that pulses are supplied to all of the wire 87*ac*, the wire 87*bc*, and the wire 87*cd*.

(4) (1) and (2) are combined, and the control circuit 90 controls switching between (1) and (2).

(5) (1) and (3) are combined, and the control circuit 90 controls switching between (1) and (2), and (6) (1), (2), and (3) are combined, and the control circuit 90 controls switching between (1), (2), and (3).

Third Modification

Figure 9:
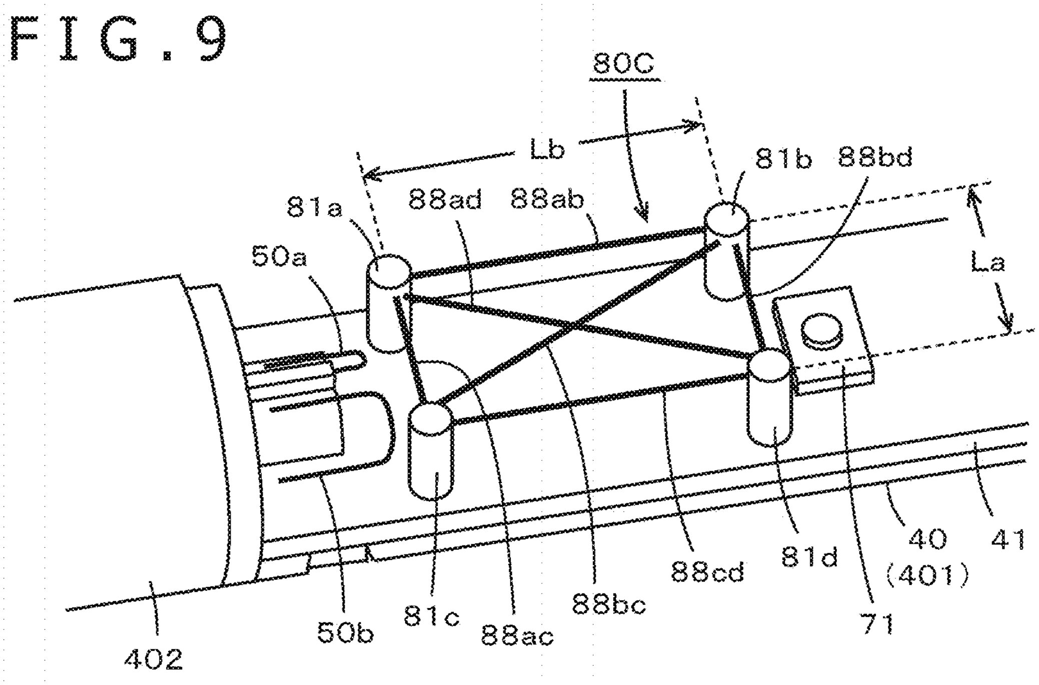
FIG. 9 is a diagram explaining a configuration of yet another example of the vibrator used in the electronic pen according to the embodiment of the present disclosure.
Figure 10:
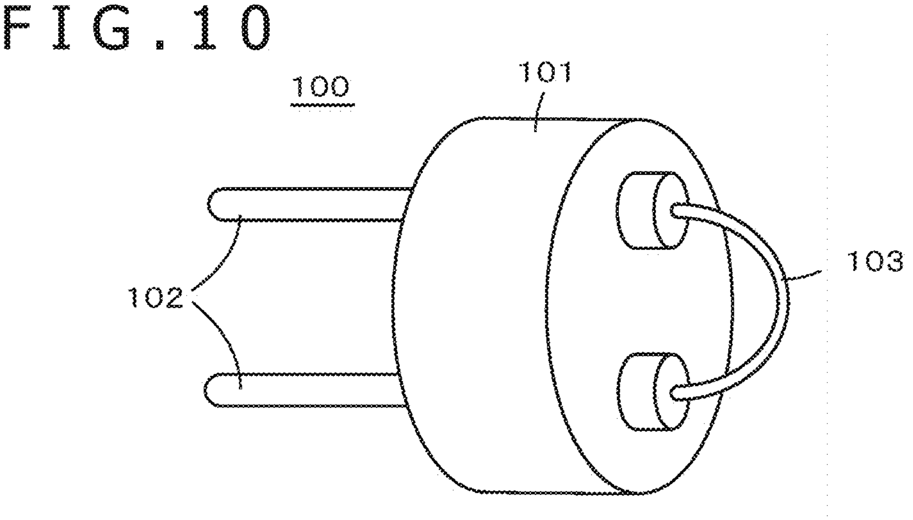
FIG. 10 is a diagram illustrating an example of a conventional vibrator using a wire formed of a shape memory alloy.
Figure 11:
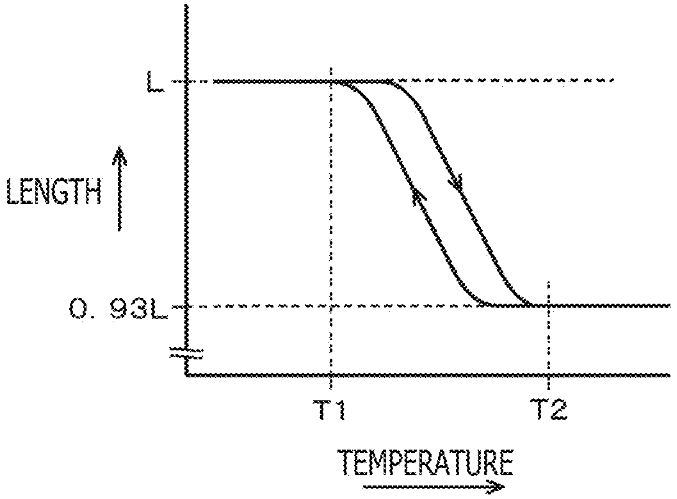
FIG. 11 is a diagram illustrating a characteristic diagram of the wire formed of a shape memory alloy.
Figure 12:
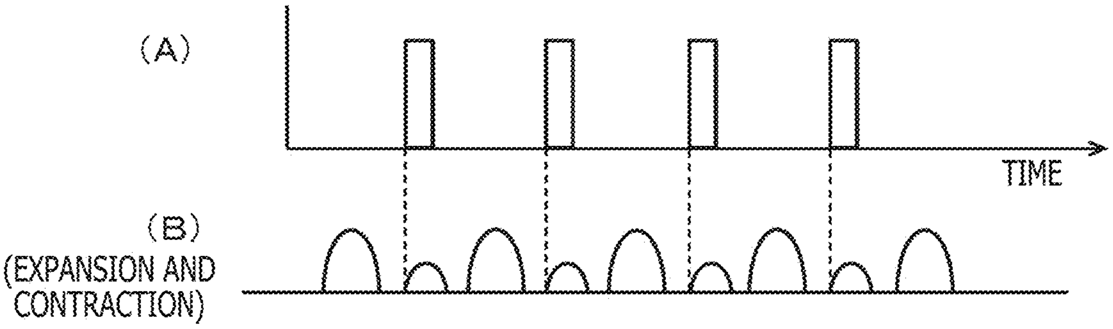
FIG. 12 is a diagram explaining a pulse voltage applied to the wire formed of a shape memory alloy.

FIG. 9 is a diagram illustrating a third modification of the vibrator, and is a view of a plurality of electrode pins arranged on the circuit board 41 as viewed from an obliquely upper side of the circuit board 41 as in the example of FIG. 8. Also in a vibrator 80C according to the third modification, the four electrode pins 81*a*, 81*b*, 81*c*, and 81*d* of the vibrator 80 according to the foregoing embodiment are used without any change. In the vibrator 80C according to the third modification, wires formed of a shape memory alloy are extended between the four electrode pins 81*a*, 81*b*, 81*c*, and 81*d*, respectively.

Specifically, a wire 88_ab_ formed of a shape memory alloy is extended between the electrode pin 81_a_ and the electrode pin 81_b_, a wire 88_ac_ formed of a shape memory alloy is extended between the electrode pin 81_a_ and the electrode pin 81_c_, and a wire 88_ad_ formed of a shape memory alloy is extended between the electrode pin 81_a_ and the electrode pin 81_d_. In addition, a wire 88_bc_ formed of a shape memory alloy is extended between the electrode pin 81_b_ and the electrode pin 81_c_, and a wire 88_bd_ formed of a shape memory alloy is extended between the electrode pin 81_b_ and the electrode pin 81_d_. Further, a wire 88_cd_ formed of a shape memory alloy is extended between the electrode pin 81_c_ and the electrode pin 81_d_. That is, in the third example, three wires are extended to each of the four electrode pins 81_a_, 81_b_, 81_c_, and 81_d_.

In this case, the wire 88_ad_ and the wire 88_bc_ intersect each other. However, the wire 88_ad_ and the wire 88_bc_ are at different height positions from the upper surface of the circuit board 41, and are thus spatially separated from each other.

Also in the third modification, as in the foregoing second modification, pulses may independently be supplied between the four electrode pins 81_a_, 81_b_, 81_c_, and 81_d_, or pulses may be supplied therebetween simultaneously. In a case where pulses are enabled to independently be supplied between the four electrode pins 81_a_, 81_b_, 81_c_, and 81_d_, a configuration can be adopted to perform control combining one to three wires, as in the foregoing second modification.

For example, the control circuit 90 may switch to a state in which pulses are applied to the two wires 88_ab_ and 88_cd_ in a direction along the long side direction of the circuit board 41 as in the embodiment described with reference to FIGS. 1A to 6, a state in which pulses are applied to the two wires 88_ac_ and 88_bd_ in the short side direction of the circuit board 41, and a state of the modification described with reference to FIGS. 7A and 7B.

OTHER EMBODIMENTS AND OTHER MODIFICATIONS

The vibrator 80 in the electronic pen 1 according to the foregoing embodiment is provided with the two wires 82_ab_ and 82_cd_ extended in parallel with each other in the longitudinal direction of the circuit board 41 between two different pairs of the electrode pins 81_a_ and 81_b_ and the electrode pins 81_c_ and 81_d_, respectively, in a direction along the long side direction of the circuit board 41. However, the vibrator 80 may be provided with one wire. Three or more wires may be provided by arranging one or more additional pairs of electrode pins in the direction along the long side direction of the circuit board 41, and extending a wire(s) between the additional pair(s).

In the foregoing first modification also, one wire may be provided, or three or more wires may be provided by arranging one or more additional pairs of electrode pins in a direction along the short side direction of the circuit board 41, and extending a wire(s) between the additional pair(s).

The above description has been made assuming that all of the heights of the plurality of electrode pins constituting the vibrator are the same. However, the heights of the electrode pins may be different from each other. Further, not all of spatial height positions at which the wires are extended need to be the same.

The electrode pins constituting the vibrator are provided on the circuit board on which a circuitry that performs signal interaction with the position detecting sensor is formed. However, the electrode pins may be provided to a member other than the circuit board on which the circuitry that performs signal interaction with the position detecting sensor is formed, as long as the member is included in the vibration transmitting member.

In the foregoing embodiment and the modifications, the vibration transmitting member for the vibration of the vibrator is constituted by the circuit board 41 and the board holder 40. However, the vibration transmitting member may be any member configured to be capable of directly or indirectly transmitting the vibration of the vibrator to the casing of the electronic pen.

The electronic pen according to the foregoing embodiment is an electronic pen of an active capacitive type. However, the electronic pen according to the present disclosure is applicable to an electronic pen of other types such as an electromagnetic induction type. Also in a case of an electronic pen of an electromagnetic induction type or the like, a pulse signal to be supplied to the vibrator can be generated in reference to a signal received through the external position detecting sensor, a signal received through the wireless communication circuit, or a signal generated according to an internal event occurring in the electronic pen.

The invention claimed is:

1. An electronic pen, comprising:

a tubular casing;

a vibration transmitting member disposed within a hollow portion of the tubular casing and capable of transmitting vibration occurring in the vibration transmitting member to the tubular casing;

a vibrator disposed on the vibration transmitting member;

a pulse generator disposed within the hollow portion of the tubular casing and configured to generate a pulse signal which drives the vibrator; and a power supply circuit disposed within the hollow portion of the tubular casing and configured to supply power to the pulse generator, wherein, the vibrator includes a plurality of electrode pins planted on the vibration transmitting member and one or more wires formed of a shape memory alloy extended between two electrode pins among the plurality of electrode pins, and the one or more wires expand and contract to thereby vibrate when supplied with the pulse signal from the pulse generator through the electrode pins, and vibration of the one or mor wires is transmitted to the tubular casing via the electrode pins and the vibration transmitting member.

2. The electronic pen according to claim 1, comprising:

a circuit board including circuitry configured to perform signal interaction with a position detecting sensor disposed within the hollow portion of the tubular casing, wherein, the vibration transmitting member includes the circuit board, and the plurality of pins of the vibrator are planted on the circuit board.

3. The electronic pen according to claim 2, wherein the plurality of electrode pins are planted at positions avoiding a circuit element constituting the circuitry on the circuit board, and the one or more wires are extended between the two electrode pins in such a manner as to avoid the circuit element.

4. The electronic pen according to claim 2, wherein the plurality of electrode pins are planted at positions avoiding a circuit element constituting the circuitry on the circuit board, and have a larger height from the circuit board than a height of the circuit element from the circuit board, and the one or more wires are extended between the two electrode pins in a space higher than the height of the circuit element from the circuit board.

5. The electronic pen according to claim 2, comprising:

a side switch provided on the circuit board; and an operating element disposed on an outer peripheral surface of the tubular casing and configured to control operation of the side switch, wherein, the vibrator is disposed toward a pen tip side than a position at which the side switch is provided on the circuit board.

6. The electronic pen according to claim 2, wherein the circuit board is held by a board holder within the hollow portion of the tubular casing, the vibration transmitting member includes the circuit board and the board holder, and the plurality of electrode pins of the vibrator are planted on the circuit board, and the board holder is configured to be able to transmit vibration occurring in the circuit board to the tubular casing.

7. The electronic pen according to claim 6, wherein the board holder is disposed within the hollow portion of the tubular casing in a state of being in contact with the tubular casing.

8. The electronic pen according to claim 7, comprising:

an elastic body provided within the hollow portion of the tubular casing and configured to bias the board holder to the tubular casing side such that the board holder is in contact with the tubular casing.

9. The electronic pen according to claim 1, wherein the one or more wires are so extended as to have a tensioned state between the two electrode pins.

10. The electronic pen according to claim 9, wherein the wire is formed in an elliptic ring shape, with one end portion in a longitudinal direction of the wire hooked around one of the two electrode pins and another end portion in the longitudinal direction of the wire hooked around the other of the two electrode pins.

11. The electronic pen according to claim 1, wherein each of the one or more wires is extended linearly between the two electrode pins, and both ends of the wire are fastened to the two electrode pins.

12. The electronic pen according to claim 11, comprising:

a member disposed between the two electrode pins to apply tension to the wire between the two electrode pins.

13. The electronic pen according to claim 1, wherein the electrode pins are provided with a groove for receiving the wire.

14. The electronic pen according to claim 1, wherein a plurality of wires are extended between different pairs of two electrode pins, respectively.

15. The electronic pen according to claim 14, wherein the plurality of wires are extended in parallel with each other.

16. The electronic pen according to claim 1, wherein a plurality of wires are extended to one of the plurality of electrode pins.

17. The electronic pen according to claim 16, wherein the plurality of wires extended to the one electrode pin include wires having different lengths.

18. The electronic pen according to claim 1, comprising:

a control circuit configured to control generation of the pulse signal from the pulse generator.

19. The electronic pen according to claim 18, wherein the pulse generator is configured to be capable of changing a frequency of the pulse signal under control of the control circuit.

20. The electronic pen according to claim 1, comprising:

a receiver configured to receive a signal from an outside; and a control circuit configured to control generation of the pulse signal from the pulse generator based on the signal received by the receiver.

21. The electronic pen according to claim 20, wherein the receiver is a wireless communication unit configured to communicate with an external wireless communication unit.

22. The electronic pen according to claim 20, wherein the electronic pen is an electronic pen of a capacitive coupling type, and includes a central electrode and a peripheral electrode disposed on a periphery of the central electrode, and the receiver is the central electrode or the peripheral electrode.

23. The electronic pen according to claim 1, wherein the vibrator is disposed within the hollow portion on a pen tip side of the tubular casing in a vicinity of a position at which a user holds the electronic pen.

* * * * *